United States Patent
Liu et al.

(10) Patent No.: US 10,263,751 B2
(45) Date of Patent: Apr. 16, 2019

(54) ROBUST CHANNEL RC-SUPPORTING CODING AND MODULATION METHOD AND APPARATUS

(71) Applicant: Huawei Technologies Co., Ltd., Shenzhen, Guangdong (CN)

(72) Inventors: Jianhua Liu, Shenzhen (CN); Xiaoyue He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 15/468,749

(22) Filed: Mar. 24, 2017

(65) Prior Publication Data

US 2017/0201355 A1 Jul. 13, 2017

Related U.S. Application Data

(63) Continuation of application No. PCT/CN2014/087423, filed on Sep. 25, 2014.

(51) Int. Cl.
*H04L 5/00* (2006.01)
*H04L 29/10* (2006.01)
(Continued)

(52) U.S. Cl.
CPC ............ *H04L 5/006* (2013.01); *H04L 1/0057* (2013.01); *H04L 5/0007* (2013.01);
(Continued)

(58) Field of Classification Search
CPC ..... H04L 5/006; H04L 1/0057; H04L 7/0041; H04L 1/08; H04L 7/0091; H04L 7/0079; H04W 72/082
See application file for complete search history.

(56) References Cited

U.S. PATENT DOCUMENTS

2008/0320362 A1 12/2008 Taubin et al.
2009/0089641 A1* 4/2009 Schedelbeck ......... H04L 1/0083
714/748
(Continued)

FOREIGN PATENT DOCUMENTS

CN 101237398 A 8/2008
EP 2124344 A1 11/2009
(Continued)

OTHER PUBLICATIONS

"Series G: Transmission Systems and Media, Digital Systems and Networks—Digital Sections and Digital Line System—Access Networks—Very High Speed Digital Subscriber Line Transceivers 2 (VDSL2)"; International Telecommunications Union Standardization Sector of ITU (ITU-T) G.993.2; Dec. 2011; 376 pages.

*Primary Examiner* — Anez C Ebrahim

(57) ABSTRACT

Embodiments of the present invention provide a robust channel (RC)-supporting coding and modulation method and apparatus. The method comprises: forming, on an interface between a PMD layer and a PMS-TC layer, a data frame by using bit data carried in a DMT symbol; determining first-part bit data in the data frame as uncoded bit data on the interface between the PMD layer and the PMS-TC layer, where the first-part bit data includes RC bit data, and coding second-part bit data in the data frame to obtain coded bit data; and mapping, at the PMD layer, the uncoded bit data and the coded bit data onto multiple subcarriers corresponding to the data frame, and performing modulation to obtain modulated subcarriers, where the RC bit data is mapped onto at least one RC subcarrier.

10 Claims, 5 Drawing Sheets

(51) Int. Cl.
*H04L 1/00* (2006.01)
*H04W 72/08* (2009.01)
*H04L 27/12* (2006.01)

(52) U.S. Cl.
CPC ............ *H04L 5/0046* (2013.01); *H04L 29/10* (2013.01); *H04W 72/082* (2013.01); *H04L 27/12* (2013.01)

(56) References Cited

U.S. PATENT DOCUMENTS

| | | |
|---|---|---|
| 2009/0177938 A1 | 7/2009 | Pons et al. |
| 2009/0245340 A1 | 10/2009 | Sorbara et al. |
| 2014/0050105 A1 | 2/2014 | Wang et al. |
| 2014/0105219 A1 | 4/2014 | Wang et al. |

FOREIGN PATENT DOCUMENTS

| | | |
|---|---|---|
| EP | 2784999 A2 | 10/2014 |
| WO | 2012092891 A2 | 7/2012 |

\* cited by examiner

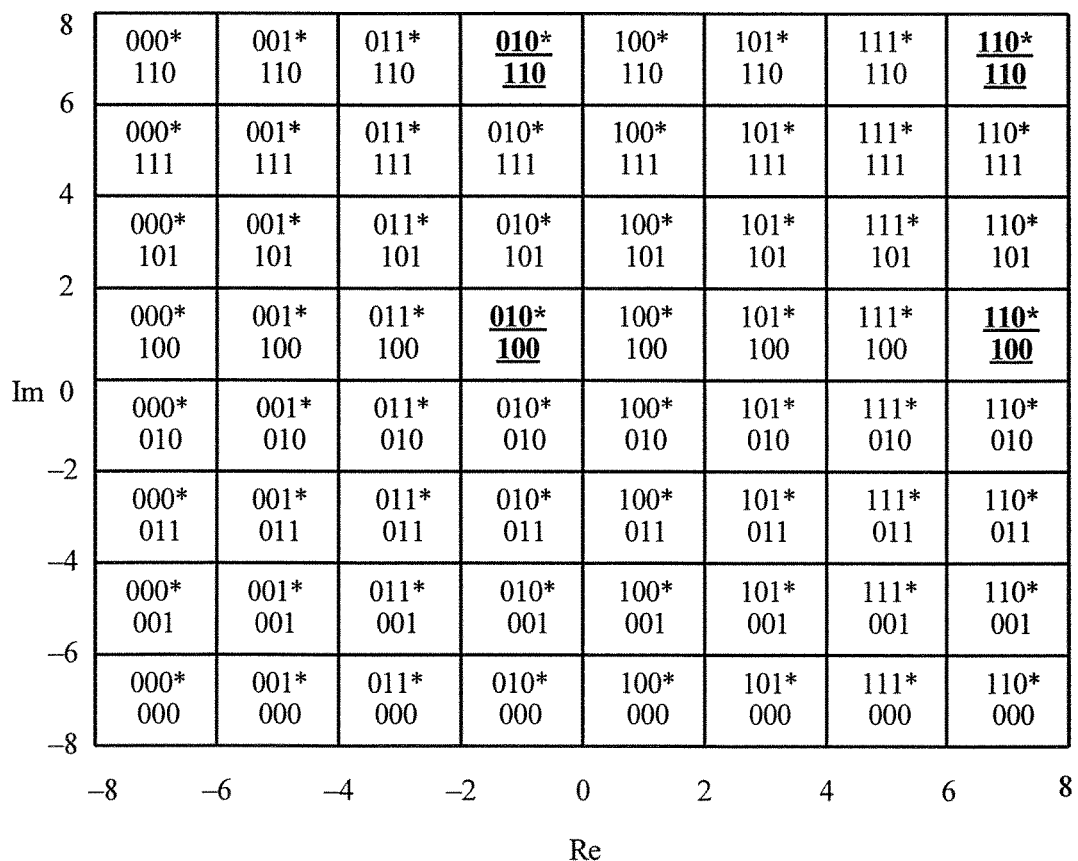

ROBUST CHANNEL RC-SUPPORTING CODING AND MODULATION METHOD AND APPARATUS

CROSS-REFERENCE TO RELATED APPLICATIONS

This application is a continuation of International Application No. PCT/CN2014/087423, filed on Sep. 25, 2014, the disclosure of which is hereby incorporated by reference in its entirety.

TECHNICAL FIELD

The present invention relates to the field of network technologies, and in particular, to a robust channel RC-supporting coding and modulation method and apparatus.

BACKGROUND

Generally, a communications system has a management and maintenance channel. Management and maintenance channels of some systems are embedded in data channels, and therefore, reliability of the management and maintenance channels is the same as reliability of the data channels. To improve reliability of management and maintenance channels of some systems, some methods for improving the reliability are specially used. For example, SNR (signal-to-noise ratio) margins of some subcarriers are increased, and these subcarriers are used to form an independent channel. The channel is referred to as an RC (robust channel) and these subcarriers are referred to as RC subcarriers. In some communications systems, channels with different reliability may be set up according to importance of service data that needs to be transmitted, so as to carry services with different reliability requirements. For example, a VoIP (Voice over Internet Protocol) service has a small data volume and requires high reliability and a low delay, and a low-speed RC channel with a low delay and high reliability may be set up in a system for the VoIP service. However, how to transmit data by using the RC channel is a problem that needs to be resolved.

In a solution in the prior art, an architecture of a signal modulation system includes a PMS-TC (physical media specific transmission convergence) layer and a PMD physical media dependent) layer. In a transmission period of each DMT (discrete multi-tone) symbol, the PMS-TC layer writes multiple pieces of bit data to the PMD layer. When the signal modulation system supports an RC channel, an interface between the PMS-TC layer and the PMD layer may be divided into an RC channel and a service data channel, and RC bit data and service bit data are respectively transmitted through the two channels in the transmission period of each DMT symbol. After a DMT data frame is formed by using the RC bit data that is obtained from the RC channel and the service bit data that is obtained from the data channel, if all bit data in the DMT data frame is coded, a DMT data frame coding rate is affected, and a throughput during decoding is high; and if bit data in the data frame is not coded, but is directly mapped onto a service subcarrier, information transmission security cannot be ensured because no coding is performed to protect the data frame.

SUMMARY

The present invention provides a robust channel RC-supporting coding and modulation method and apparatus, so that not only a coding/decoding rate can be improved, but also information transmission security can be ensured.

A first aspect of embodiments of the present invention provides a robust channel RC-supporting coding and modulation method, including:

forming, on an interface between a PMD layer and a PMS-TC layer, a data frame by using bit data carried in a DMT symbol, where the bit data carried in the DMT symbol includes RC bit data that is obtained from an RC channel and service bit data that is obtained from a service data channel;

determining first-part bit data in the data frame as uncoded bit data on the interface between the PMD layer and the PMS-TC layer, where the first-part bit data includes the RC bit data, and coding second-part bit data in the data frame to obtain coded bit data, where the data frame includes the first-part bit data and the second-part bit data; and mapping, at the PMD layer, the uncoded bit data and the coded bit data onto multiple subcarriers corresponding to the data frame, and performing modulation to obtain modulated subcarriers, where the multiple subcarriers corresponding to the data frame include at least one RC subcarrier, and the RC bit data is mapped onto the at least one RC subcarrier.

In a first possible implementation manner of the first aspect, the determining first-part bit data in the data frame as uncoded bit data on the interface between the PMD layer and the PMS-TC layer, where the first-part bit data includes the RC bit data, and coding second-part bit data in the data frame to obtain coded bit data includes:

obtaining an amount of uncoded bit data carried in each subcarrier of the multiple subcarriers corresponding to the data frame; and calculating a sum of amounts of uncoded bit data carried in the multiple subcarriers, and using the sum as an amount of the first-part bit data in the data frame.

In a second possible implementation manner of the first aspect, the determining first-part bit data in the data frame as uncoded bit data on the interface between the PMD layer and the PMS-TC layer, where the first-part bit data includes the RC bit data, and coding second-part bit data in the data frame to obtain coded bit data includes:

obtaining coding efficiency of coding bit data in the data frame;

obtaining an amount of coded bit data carried in each subcarrier of the multiple subcarriers corresponding to the data frame;

calculating a sum of amounts of coded bit data carried in the multiple subcarriers; and calculating an amount of the second-part bit data in the data frame according to the sum of the amounts of coded bit data carried in the multiple subcarriers and according to the coding efficiency of coding the bit data in the data frame.

In a third possible implementation manner of the first aspect, the modulated subcarrier includes an uncoded subcarrier component and a coded subcarrier component; and the mapping, at the PND layer, the uncoded bit data and the coded bit data onto multiple subcarriers corresponding to the data frame, and performing modulation to obtain modulated subcarriers includes:

separately obtaining an amount of uncoded bit data carried in a target subcarrier in the multiple subcarriers and an amount of coded bit data carried in the target subcarrier;

mapping the uncoded bit data onto the target subcarrier according to the amount of uncoded bit data carried in the target subcarrier, to obtain an uncoded subcarrier component of the target subcarrier; and mapping the coded bit data onto the target subcarrier according to the amount of coded bit data carried in the target subcarrier, to obtain a coded subcarrier component of the target subcarrier.

With reference to any one of the first aspect, or the first to the third possible implementation manners of the first aspect, in a fourth possible implementation manner of the first aspect, the coding second-part bit data in the data frame to obtain coded bit data includes:

performing low-density parity-check coding on the second-part bit data in the data frame to obtain the coded bit data.

A second aspect of embodiments of the present invention provides a robust channel RC-supporting coding and modulation apparatus, including:

a data obtaining module, configured to form, on an interface between a PMD layer and a PMS-TC layer, a data frame by using bit data carried in a DMT symbol, where the bit data carried in the DMT symbol includes RC bit data that is obtained from an RC channel and service bit data that is obtained from a service data channel;

a data coding module, configured to: determine first-part bit data in the data frame as uncoded bit data on the interface between the PMD layer and the PMS-TC layer, where the first-part bit data includes the RC bit data; and code second-part bit data in the data frame to obtain coded bit data, where the data frame includes the first-part bit data and the second-part bit data; and a data modulation module, configured to: map, at the PMD layer, the uncoded bit data and the coded bit data onto multiple subcarriers corresponding to the data frame, and perform modulation to obtain modulated subcarriers, where the multiple subcarriers corresponding to the data frame include at least one RC subcarrier, and the RC bit data is mapped onto the at least one RC subcarrier.

In a first possible implementation manner of the second aspect, the data coding module is further configured to: obtain an amount of uncoded bit data carried in each subcarrier of the multiple subcarriers corresponding to the data frame; and calculate a sum of amounts of uncoded bit data carried in the multiple subcarriers, and use the sum as an amount of the first-part bit data in the data frame.

In a second possible implementation manner of the second aspect, the data coding module is further configured to: obtain coding efficiency of coding bit data in the data frame, obtain an amount of coded bit data carried in each subcarrier of the multiple subcarriers corresponding to the data frame, calculate a sum of amounts of coded bit data carried in the multiple subcarriers, and calculate an amount of the second-part bit data in the data frame according to the sum of the amounts of coded bit data carried in the multiple subcarriers and according to the coding efficiency of coding the bit data in the data frame.

In a third possible implementation manner of the second aspect, the modulated subcarrier includes an uncoded subcarrier component and a coded subcarrier component; and the data modulation module includes:

an amount obtaining unit, configured to separately obtain an amount of uncoded bit data carried in a target subcarrier in the multiple subcarriers and an amount of coded bit data carried in the target subcarrier;

a first mapping unit, configured to map the uncoded bit data onto the target subcarrier according to the amount of uncoded bit data carried in the target subcarrier, to obtain an uncoded subcarrier component of the target subcarrier; and a second mapping unit, configured to map the coded bit data onto the target subcarrier according to the amount of coded bit data carried in the target subcarrier, to obtain a coded subcarrier component of the target subcarrier.

With reference to any one of the second aspect, or the first to the third possible implementation manners of the second aspect, in a fourth possible implementation manner of the second aspect, the data coding module is specifically configured to perform low-density parity-check coding on the second-part bit data in the data frame to obtain the coded bit data.

A third aspect of the present invention provides a robust channel RC-supporting coding and modulation apparatus, where the apparatus includes a network interface, a memory, and a processor, the memory stores a group of program code, and the processor is configured to invoke the program code stored in the memory and is configured to perform the following operations:

fainting, on an interface between a PMD layer and a PMS-TC layer, a data frame by using bit data carried in a DMT symbol, where the bit data carried in the DMT symbol includes RC bit data that is obtained from an RC channel and service bit data that is obtained from a service data channel;

determining first-part bit data in the data frame as uncoded bit data on the interface between the PMD layer and the PMS-TC layer, where the first-part bit data includes the RC bit data, and coding second-part bit data in the data frame to obtain coded bit data, where the data frame includes the first-part bit data and the second-part bit data; and mapping, at the PMD layer, the uncoded bit data and the coded bit data onto multiple subcarriers corresponding to the data frame, and performing modulation to obtain modulated subcarriers, where the multiple subcarriers corresponding to the data frame include at least one RC subcarrier, and the RC bit data is mapped onto the at least one RC subcarrier.

In the embodiments of the present invention, first, a data frame is formed on an interface between a PMD layer and a PMS-TC layer by using bit data carried in a DMT symbol; then, first-part bit data that is in the data frame and that includes RC bit data is determined as uncoded bit data, and second-part bit data in the data frame is coded to obtain coded bit data; finally, the uncoded bit data and the coded bit data are mapped onto multiple subcarriers corresponding to the data frame, and modulation is performed to obtain modulated subcarriers, and the RC bit data is mapped onto an RC subcarrier. Therefore, not only a coding rate is improved, but also RC data information transmission security is ensured.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 3 is a schematic structural diagram of a DMT data frame according to an embodiment of the present invention;

FIG. 4 is a 64QAM constellation diagram according to an embodiment of the present invention;

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention provide a robust channel RC-supporting coding and modulation method and apparatus, so that not only coding/decoding efficiency of a data frame can be improved, but also information transmission security can be ensured. Details are separately described in the following.

Figure 1:
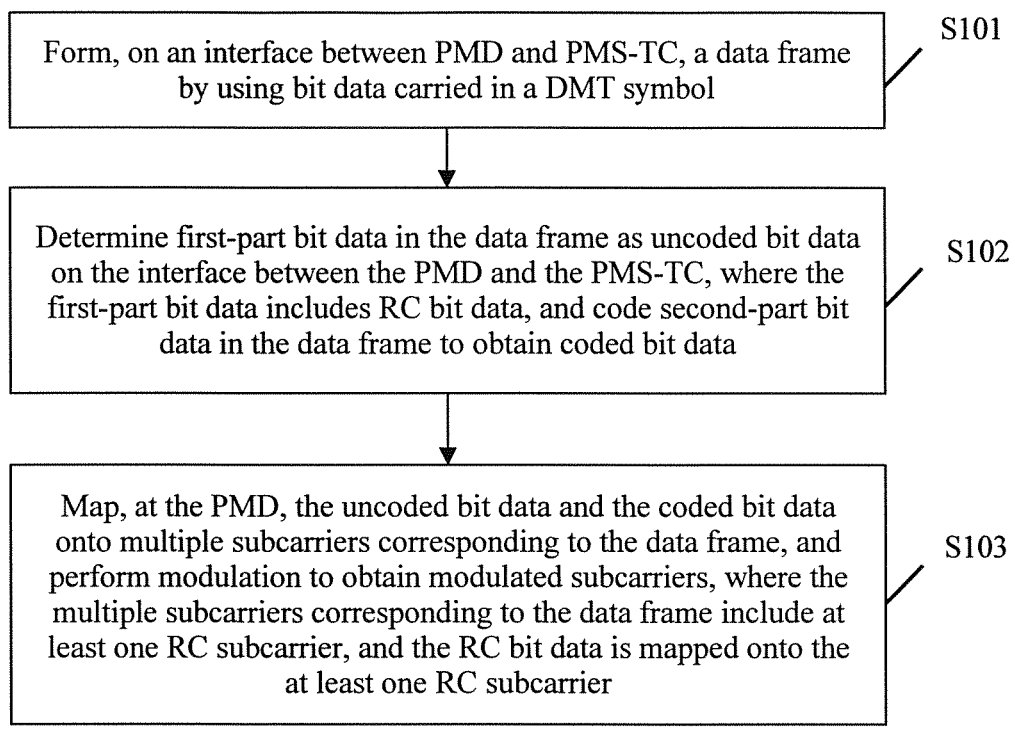
FIG. 1 is a flowchart of a robust channel RC-supporting coding and modulation method according to an embodiment of the present invention.

Referring to FIG. 1, FIG. 1 is a flowchart of a robust channel RC-supporting coding and modulation method according to an embodiment of the present invention. As shown in FIG. 1, the method in this embodiment of the present invention includes the following steps.

S101. Form, on an interface between a PMD layer and a PMS-TC layer, a data frame by using bit data carried in a DMT symbol, where the bit data carried in the DMT symbol includes RC bit data that is obtained from an RC channel and service bit data that is obtained from a service data channel.

In specific implementation, the RC bit data may be first obtained from the RC channel, and then the service bit data is obtained from the service data channel. Therefore, in the data frame, the RC bit data is permuted in front of the service bit data. For example, FIG. 3 shows a data frame obtained by using L0 pieces of RC bit data that are obtained from the RC channel and L1 pieces of service bit data that are obtained from the service data channel. There may be one or more pieces of RC bit data, and there may also be one or more pieces of service bit data.

S102. Determine first-part bit data in the data frame as uncoded bit data on the interface between the PMD layer and the PMS-TC layer, where the first-part bit data includes the RC bit data, and code second-part bit data in the data frame to obtain coded bit data, where the data frame includes the first-part bit data and the second-part bit data.

In specific implementation, an amount of uncoded bit data carried in each subcarrier of multiple subcarriers corresponding to the data frame may be obtained, and a sum of amounts of uncoded bit data carried in the multiple subcarriers is calculated and is used as an amount of the first-part bit data in the data frame. An amount of bit data (uncoded bit data and coded bit data) carried in each subcarrier may be determined in the following manner: An SNR (signal-to-noise ratio), a Coding_gain (coding gain), an SNR_gap (signal-to-noise ratio gap), and an SNR_margin (signal-to-noise ratio margin) of each subcarrier are obtained, and the amount of bit data carried in each DMT subcarrier is calculated according to the SNR, the Coding_gain, the SNR_gap, and the SNR_margin of each subcarrier by using a Shannon's equation:

$$n = \log_2\left(1 + \frac{SNR}{SNR\_gap + SNR\_margin - Coding\_gain}\right).$$

After the amount of bit data carried in each subcarrier is calculated, a threshold of the amount of uncoded bit data carried in each subcarrier may be preset in an amount range of the bit data carried in the subcarrier, and an amount of uncoded bit data actually carried in the subcarrier is not greater than the threshold.

In addition, coding efficiency of coding bit data in the data frame may be obtained; an amount of coded bit data carried in each subcarrier of the multiple subcarriers corresponding to the data frame is obtained; a sum of amounts of coded bit data carried in the multiple subcarriers is calculated; and an amount of the second-part bit data in the data frame is calculated according to the sum of the amounts of coded bit data carried in the multiple subcarriers and according to the coding efficiency of coding the bit data in the data frame. The coded bit data includes an information bit and a redundancy bit. The coding efficiency is a value obtained by dividing a length of the information bit by a sum of the length of the information bit and a length of the redundancy bit. The redundancy bit is used to check the coded bit data when decoding is performed at a signal receive end.

For example, as shown in FIG. 3, when the sum of the amounts of uncoded bit data carried in the multiple subcarriers corresponding to the data frame is Lu, the amount of the first-part bit data in the data frame is Lu. When the sum of the amounts of coded bit data carried in the multiple subcarriers is La, and when the coding efficiency is R, the amount of the second-part bit data in the data frame is Lc=La×R. It should be noted that the amount of the first-part bit data in the DMT data frame is not less than an amount of the RC bit data.

Optionally, LDPC (low-density parity-check) coding is performed on the second-part bit data in the DMT data frame, to obtain the coded bit data. Coding intensity of LDPC code is high. Therefore, an LDPC coding method may be preferentially used for coding.

It should be noted that implementation procedures of S101 and S102 are implemented on the interface between the PMD layer and the PMS-TC layer, that is, data is transmitted and adapted in an intermediate process from the PMS-TC layer to the PMD layer. Further, S101 and S102 may be implemented on the interface under control of the PMD layer or the PMS-TC layer.

S103. Map, at the PMD layer, the uncoded bit data and the coded bit data onto multiple subcarriers corresponding to the data frame, and perform modulation to obtain modulated subcarriers, where the multiple subcarriers corresponding to the data frame include at least one RC subcarrier, and the RC bit data is mapped onto the at least one RC subcarrier.

In specific implementation, RC subcarriers in the multiple subcarriers corresponding to the data frame are in consecutive. Therefore, in a bit data loading table, RC subcarriers and service subcarriers are interleaved. In the data frame, the RC subcarriers may be permuted in front of the service subcarrier, so that all RC bit data permuted in front of the service bit data is mapped onto the RC subcarriers. In this way, the RC bit data in the uncoded bit data may be mapped, starting from the first RC bit data, onto the RC subcarriers in the bit data loading table. An amount of uncoded bit data carried in the at least one RC subcarrier need to be no less than the amount of the RC bit data, so that all the RC bit data can be mapped onto the RC subcarrier. After the uncoded bit data and the coded bit data are mapped onto all RC subcarriers, remaining uncoded bit data and remaining coded bit data are mapped onto the service subcarriers. In addition, an SNR_margin of the RC subcarrier may be configured by a user, but the SNR_margin of the RC subcarrier needs to be greater than an SNR_margin of the service subcarrier.

In this embodiment of the present invention, first, a data frame is formed on an interface between a PMD layer and a PMS-TC layer by using bit data carried in a DMT symbol; then, first-part bit data that is in the data frame and that includes RC bit data is determined as uncoded bit data, and second-part bit data in the data frame is coded to obtain coded bit data; finally, the uncoded bit data and the coded bit data are mapped onto multiple subcarriers corresponding to the data frame, and modulation is performed to obtain modulated subcarriers, and the RC bit data is mapped onto an RC subcarrier. Therefore, not only a coding rate is improved, but also RC data information transmission security is ensured.

Figure 2:
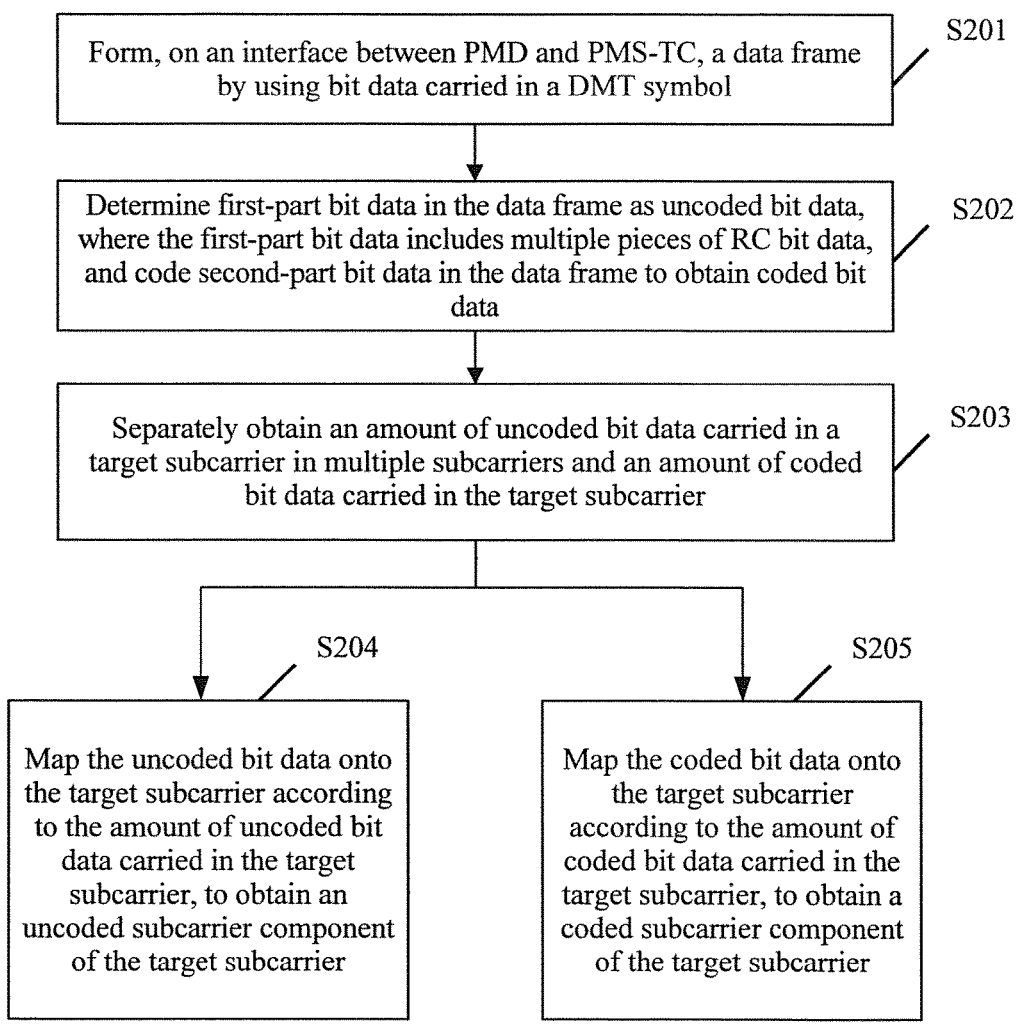
FIG. 2 is a flowchart of another embodiment of a robust channel RC-supporting coding and modulation method according to the present invention.

Referring to FIG. 2, FIG. 2 is a flowchart of a robust channel RC-supporting coding and modulation method according to a second embodiment of the present invention. As shown in FIG. 2, the method in this embodiment of the present invention includes the following steps.

S201. Form, on an interface between a PMD layer and a PMS-TC layer, a DMT data frame by using bit data carried in a DMT symbol, where the DMT data frame includes RC bit data that is obtained from an RC channel in a transmission period of the DMT symbol and service bit data that is obtained from a service data channel in the transmission period of the DMT symbol.

In specific implementation, the RC bit data may be first obtained from the RC channel, and then the service bit data is obtained from the service data channel. Therefore, in the data frame, the RC bit data is permuted in front of the service bit data. For example, FIG. 3 shows a data frame obtained by using L0 pieces of RC bit data that are obtained from the RC channel and L1 pieces of service bit data that are obtained from the service data channel.

S202. Determine first-part bit data in the data frame as uncoded bit data on the interface between the PMD layer and the PMS-TC layer, where the first-part bit data includes the RC bit data, and code second-part bit data in the DMT data frame to obtain coded bit data, where the DMT data frame includes the first-part bit data and the second-part bit data.

In specific implementation, an amount of uncoded bit data carried in each subcarrier of multiple subcarriers corresponding to the data frame may be obtained, and a sum of amounts of uncoded bit data carried in the multiple subcarriers is calculated and is used as an amount of the first-part bit data in the data frame. An amount of bit data (uncoded bit data and coded bit data) carried in each subcarrier may be determined in the following manner: An SNR (signal-to-noise ratio), a Coding_gain (coding gain), an SNR_gap (signal-to-noise ratio gap), and an SNR_margin (signal-to-noise ratio margin) of each subcarrier are obtained, and the amount of bit data carried in each DMT subcarrier is calculated according to the SNR, the Coding_gain, the SNR_gap, and the SNR_margin of each subcarrier by using a Shannon's equation:

$$n = \log_2\left(1 + \frac{SNR}{SNR\_gap + SNR\_margin - Coding\_gain}\right).$$

After the amount of bit data carried in each subcarrier is calculated, a threshold of the amount of uncoded bit data carried in each subcarrier may be preset in an amount range of the bit data carried in the subcarrier, and an amount of uncoded bit data actually carried in the subcarrier is not greater than the threshold.

In addition, coding efficiency of coding bit data in the data frame may be obtained; an amount of coded bit data carried in each subcarrier of the multiple subcarriers corresponding to the data frame is obtained; a sum of amounts of coded bit data carried in the multiple subcarriers is calculated; and an amount of the second-part bit data in the data frame is calculated according to the sum of the amounts of coded bit data carried in the multiple subcarriers and according to the coding efficiency of coding the bit data in the data frame. The coded bit data includes an information bit and a redundancy bit. The coding efficiency is a value obtained by dividing a length of the information bit by a sum of the length of the information bit and a length of the redundancy bit. The redundancy bit is used to check the coded bit data when decoding is performed at a signal receive end.

For example, as shown in FIG. 3, when the sum of the amounts of uncoded bit data carried in the multiple subcarriers corresponding to the data frame is Lu, the amount of the first-part bit data in the data frame is Lu. When the sum of the amounts of coded bit data carried in the multiple subcarriers is La, and when the coding efficiency is R, the amount of the second-part bit data in the data frame is Lc=La×R. It should be noted that the amount of the first-part bit data in the DMT data frame is not less than an amount of the RC bit data.

Optionally, LDPC (low-density parity-check) coding is performed on the second-part bit data in the DMT data frame, to obtain the coded bit data. Coding intensity of LDPC code is high. Therefore, an LDPC coding method may be preferentially used for coding.

It should be noted that implementation procedures of S201 and S202 may be implemented under control of the PMD layer or the PMS-TC layer.

S203. Separately obtain an amount of uncoded bit data carried in a target subcarrier in multiple subcarriers and an amount of coded bit data carried in the target subcarrier.

It should be noted that after the amount of bit data carried in each subcarrier is calculated, a threshold of the amount of uncoded bit data carried in the target subcarrier may be preset in an amount range of bit data carried in the target subcarrier, and an amount of uncoded bit data actually carried in the target subcarrier is not greater than the threshold. Likewise, a threshold of the amount of coded bit data carried in the target subcarrier may be preset in the amount range of the bit data carried in the target subcarrier, and an amount of coded bit data actually carried in the target subcarrier is not greater than the threshold.

S204. Map the uncoded bit data onto the target subcarrier according to the amount of uncoded bit data carried in the target subcarrier, to obtain an uncoded subcarrier component of the target subcarrier.

S205. Map the coded bit data onto the target subcarrier according to the amount of coded bit data carried in the target subcarrier, to obtain a coded subcarrier component of the target subcarrier.

Implementation procedures of S203 to S205 are implemented under control of the PMD layer.

For example, a subcarrier carries eight pieces of bit data: $d_3d_2d_1d_0c_3c_2c_1c_0$. $d_3d_2d_1d_0$ are uncoded bit data, and $c_3c_2c_1c_0$ are coded bit data. The uncoded bit data is further divided into $I_d$ components and $Q_d$ components. The $I_d$ components are $d_3d_2$, and the $Q_d$ components are $d_1d_0$. The coded bit data is further divided into $I_c$ components and $Q_c$ components. The $I_c$ components are $c_3c_2$, and the $Q_c$ components are $c_1c_0$. Gray mapping is separately performed on the uncoded bit data and the coded bit data to obtain uncoded subcarrier components $(I_u, Q_u)$ and coded subcarrier components $(I_c, Q_c)$. Finally, the uncoded subcarrier components $(I_u, Q_u)$ and the coded subcarrier components $(I_c, Q_c)$ are combined to obtain a modulated target subcarrier (I, Q). The modulated target subcarrier may be represented as rectangular constellation coordinates. $(I,Q)=l\times(I_u,Q_u)+(I_c,Q_c)$, and l=4 (when an amount of the uncoded bit data is 2, l=2; when an amount of the uncoded bit data is 4, l=4; when an amount of the uncoded bit data is 6, l=6).

It should be noted that, generally, in LDPC, the coded bit data is mapped onto least significant bits (LSB) of a subcarrier, and the uncoded bit data is mapped onto most significant bits (MSB) of the subcarrier. A Euclidean distance of the most-significant uncoded bit data is increased by using a coset technology. For example, in 64QAM modulation, four least significant bits (b3, b2, b1, and b0) are coded bit data, and two most significant bits (a1 and a0) are uncoded bit data. A rectangular constellation diagram obtained by modulating the uncoded bit data and the coded bit data is shown in FIG. 4. In the figure, four bold points form a coset of the uncoded bit data. Least-significant coded bit data at the four points is the same (1010). Therefore, most-significant uncoded bit data foil's a coset, and a Euclidean distance between points in the coset is increased by 4 times (12 dB). When demodulation is performed at the signal receive end, first, the coset that includes the most-significant uncoded bit data is determined according to the least-significant coded bit data, and then a specific point in the determined coset is determined according to a minimum Euclidean distance criterion, and the most-significant uncoded bit data is demapped. The uncoded bit data may be protected at a same level as the coded bit data by using a coset relationship. Therefore, a bit error rate of the uncoded bit data is the same as that of the coded bit data.

In this embodiment of the present invention, first, a data frame is formed on an interface between a PMD layer and a PMS-TC layer by using bit data carried in a DMT symbol; then, first-part bit data that is in the data frame and that includes RC bit data is determined as uncoded bit data, and second-part bit data in the data frame is coded to obtain coded bit data; finally, the uncoded bit data and the coded bit data are mapped onto multiple subcarriers corresponding to the data frame, and modulation is performed to obtain modulated subcarriers, and the RC bit data is mapped onto an RC subcarrier. Therefore, not only a coding rate is improved, but also RC data information transmission security is ensured.

Figure 5:
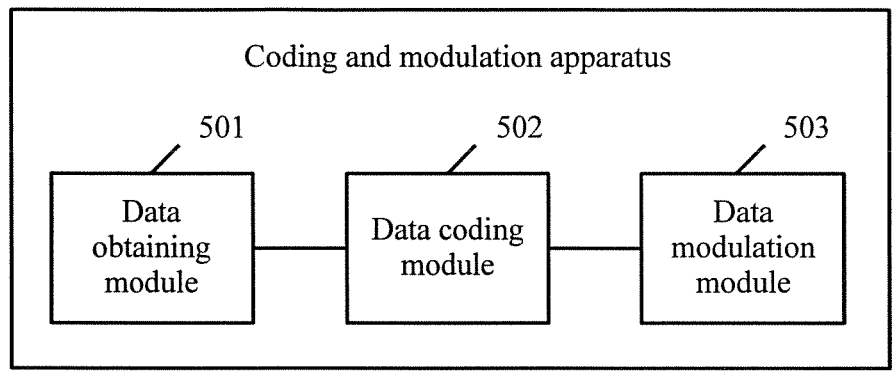
FIG. 5 is a schematic structural diagram of a robust channel RC-supporting coding and modulation apparatus according to an embodiment of the present invention.

Referring to FIG. 5, FIG. 5 shows an RC channel-supporting apparatus in an LDPC coding and modulation scheme according to an embodiment of the present invention. As shown in FIG. 5, the apparatus in this embodiment of the present invention includes a data obtaining module 501, a data coding module 502, and a data modulation module 503.

The data obtaining module 501 is configured to fault, on an interface between a PMD layer and a PMS-TC layer, a DMT data frame by using bit data carried in a DMT symbol. The DMT data frame includes RC bit data that is obtained from an RC channel in a transmission period of the DMT symbol and service bit data that is obtained from a service data channel in the transmission period of the DMT symbol.

In specific implementation, the RC bit data may be first obtained from the RC channel, and then the service bit data is obtained from the service data channel. Therefore, in the data frame, the RC bit data is permuted in front of the service bit data. For example, FIG. 3 shows a data frame obtained by using L0 pieces of RC bit data that are obtained from the RC channel and L1 pieces of service bit data that are obtained from the service data channel.

The data coding module 502 is configured to: determine first-part bit data in DMT the data frame as uncoded bit data on the interface between the PND layer and the PMS-TC layer, where the first-part bit data includes the RC bit data; and code second-part bit data in the DMT data frame to obtain coded bit data. The DMT data frame includes the first-part bit data and the second-part bit data.

In specific implementation, an amount of uncoded bit data carried in each subcarrier of multiple subcarriers corresponding to the data frame may be obtained, and a sum of amounts of uncoded bit data carried in the multiple subcarriers is calculated and is used as an amount of the first-part bit data in the data frame. An amount of bit data (uncoded bit data and coded bit data) carried in each subcarrier may be determined in the following manner: An SNR (signal-to-noise ratio), a Coding_gain (coding gain), an SNR_gap (signal-to-noise ratio gap), and an SNR_margin (signal-to-noise ratio margin) of each subcarrier are obtained, and the amount of bit data carried in each DMT subcarrier is calculated according to the SNR, the Coding_gain, the SNR_gap, and the SNR_margin of each subcarrier by using a Shannon's equation:

$$n = \log_2\left(1 + \frac{SNR}{SNR\_gap + SNR\_margin - Coding\_gain}\right).$$

After the amount of bit data carried in each subcarrier is calculated, a threshold of the amount of uncoded bit data carried in each subcarrier may be preset in an amount range of the bit data carried in the subcarrier, and an amount of uncoded bit data actually carried in the subcarrier is not greater than the threshold.

In addition, coding efficiency of coding bit data in the data frame may be obtained; an amount of coded bit data carried in each subcarrier of the multiple subcarriers corresponding to the data frame is obtained; a sum of amounts of coded bit data carried in the multiple subcarriers is calculated; and an amount of the second-part bit data in the data frame is calculated according to the sum of the amounts of coded bit data carried in the multiple subcarriers and according to the coding efficiency of coding the bit data in the data frame. The coded bit data includes an information bit and a redundancy bit. The coding efficiency is a value obtained by dividing a length of the information bit by a sum of the length of the information bit and a length of the redundancy bit. The redundancy bit is used to check the coded bit data when decoding is performed at a signal receive end.

For example, as shown in FIG. 3, when the sum of the amounts of uncoded bit data carried in the multiple subcarriers corresponding to the data frame is Lu, the amount of the first-part bit data in the data frame is Lu. When the sum of the amounts of coded bit data carried in the multiple subcarriers is La, and when the coding efficiency is R, the amount of the second-part bit data in the data frame is Lc=La×R. It should be noted that the amount of the first-part bit data in the DMT data frame is not less than an amount of the RC bit data.

Optionally, LDPC (low-density parity-check) coding is pertained on the second-part bit data in the DMT data frame, to obtain the coded bit data. Coding intensity of LDPC code is high. Therefore, an LDPC coding method may be preferentially used for coding.

It should be noted that the data obtaining module 501 and the data coding module 502 may be controlled by the PMD layer or the PMS-TC layer.

The data modulation module 503 is configured to: map, at the PMD layer, the uncoded bit data and the coded bit data onto multiple subcarriers corresponding to the data frame, and perform modulation to obtain modulated subcarriers. The multiple subcarriers corresponding to the data frame include at least one RC subcarrier, and the RC bit data is mapped onto the at least one RC subcarrier. The modulated subcarrier includes an uncoded subcarrier component and a coded subcarrier component.

In specific implementation, RC subcarriers in the multiple subcarriers corresponding to the data frame are in consecutive. Therefore, in a bit data loading table, RC subcarriers and service subcarriers are interleaved. In the data frame, the RC subcarriers may be permuted in front of the service subcarrier, so that all RC bit data permuted in front of the service bit data is mapped onto the RC subcarriers. In this way, the RC bit data in the uncoded bit data may be mapped, starting from the first RC bit data, onto the RC subcarriers in the bit data loading table. An amount of uncoded bit data carried in the at least one RC subcarrier need to be no less than the amount of the RC bit data, so that all the RC bit data can be mapped onto the RC subcarrier. After the uncoded bit data and the coded bit data are mapped onto all RC subcarriers, remaining uncoded bit data and remaining coded bit data are mapped onto the service subcarriers. In addition, an SNR_margin of the RC subcarrier may be configured by a user, but the SNR_margin of the RC subcarrier needs to be greater than an SNR_margin of the service subcarrier.

Figure 6:
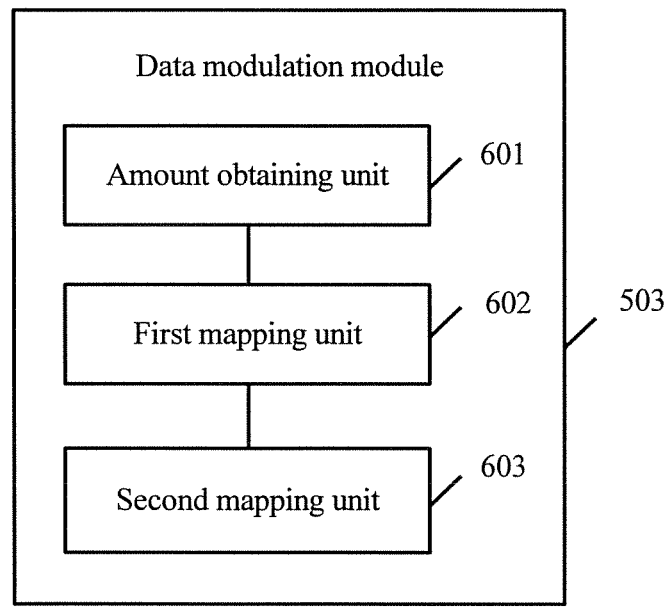
FIG. 6 is a schematic structural diagram of a data modulation module in an apparatus according to an embodiment of the present invention.

Optionally, as shown in FIG. 6, the data modulation module 503 may further include an amount obtaining unit 601, a first mapping unit 602, and a second mapping unit 603.

The amount obtaining unit 601 is configured to separately obtain an amount of uncoded bit data carried in a target subcarrier in the multiple subcarriers and an amount of coded bit data carried in the target subcarrier.

It should be noted that after the amount of bit data carried in each subcarrier is calculated, a threshold of the amount of uncoded bit data carried in the target subcarrier may be preset in an amount range of bit data carried in the target subcarrier, and an amount of uncoded bit data actually carried in the target subcarrier is not greater than the threshold. Likewise, a threshold of the amount of coded bit data carried in the target subcarrier may be preset in the amount range of the bit data carried in the target subcarrier, and an amount of coded bit data actually carried in the target subcarrier is not greater than the threshold.

The first mapping unit 602 is configured to map the uncoded bit data onto the target subcarrier according to the amount of uncoded bit data carried in the target subcarrier, to obtain an uncoded subcarrier component of the target subcarrier.

The second mapping unit 603 is configured to map the coded bit data onto the target subcarrier according to the amount of coded bit data carried in the target subcarrier, to obtain a coded subcarrier component of the target subcarrier. Finally, the uncoded subcarrier component and the coded subcarrier component are combined to obtain a modulated target subcarrier.

For example, a subcarrier carries eight pieces of bit data: $d_3d_2d_1d_0c_3c_2c_1c_0$. $d_3d_2d_1d_0$ are uncoded bit data, and $c_3c_2c_1c_0$ are coded bit data. The uncoded bit data is further divided into $I_d$ components and $Q_d$ components. The $I_d$ components are $d_3d_2$, and the $Q_d$ components are $d_1d_0$. The coded bit data is further divided into $I_c$ components and $Q_c$ components. The $I_c$ components are $c_3c_2$, and the $Q_c$ components are $c_1c_0$. Gray mapping is separately performed on the uncoded bit data and the coded bit data to obtain uncoded subcarrier components $(I_u,Q_u)$ and coded subcarrier components $(I_c,Q_c)$. Finally, the uncoded subcarrier components $(I_u,Q_u)$ and the coded subcarrier components $(I_c,Q_c)$ are combined to obtain a modulated target subcarrier $(I,Q)$. The modulated target subcarrier may be represented as rectangular constellation coordinates. $(I,Q)=l\times(I_u,Q_u)+(I_c,Q_c)$, and $l=4$ (when an amount of the uncoded bit data is 2, $l=2$; when an amount of the uncoded bit data is 4, $l=4$; when an amount of the uncoded bit data is 6, $l=6$).

It should be noted that, generally, in LDPC, the coded bit data is mapped onto least significant bits (LSB) of a subcarrier, and the uncoded bit data is mapped onto most significant bits (MSB) of the subcarrier. A Euclidean distance of the most-significant uncoded bit data is increased by using a coset technology. For example, in 64QAM modulation, four least significant bits (b3, b2, b1, and b0) are coded bit data, and two most significant bits (a1 and a0) are uncoded bit data. A rectangular constellation diagram obtained by modulating the uncoded bit data and the coded bit data is shown in FIG. 4. In the figure, four points in a black circle part are a coset of the uncoded bit data. Least-significant coded bit data at the four points is the same (1010). Therefore, most-significant uncoded bit data forms a coset, and a Euclidean distance between points in the coset is increased by 4 times (12 dB). When demodulation is performed at the signal receive end, first, the coset that includes the most-significant uncoded bit data is determined according to the least-significant coded bit data, and then a specific point in the determined coset is determined according to a minimum Euclidean distance criterion, and the most-significant uncoded bit data is demapped. The uncoded bit data may be protected at a same level as the coded bit data by using a coset relationship. Therefore, a bit error rate of the uncoded bit data is the same as that of the coded bit data.

In this embodiment of the present invention, first, a data frame is formed on an interface between a PMD layer and a PMS-TC layer by using bit data carried in a DMT symbol; then, first-part bit data that is in the data frame and that includes RC bit data is determined as uncoded bit data, and second-part bit data in the data frame is coded to obtain coded bit data; finally, the uncoded bit data and the coded bit data are mapped onto multiple subcarriers corresponding to the data frame, and modulation is performed to obtain modulated subcarriers, and the RC bit data is mapped onto an RC subcarrier. Therefore, not only a coding rate is improved, but also RC data information transmission security is ensured.

Figure 7:
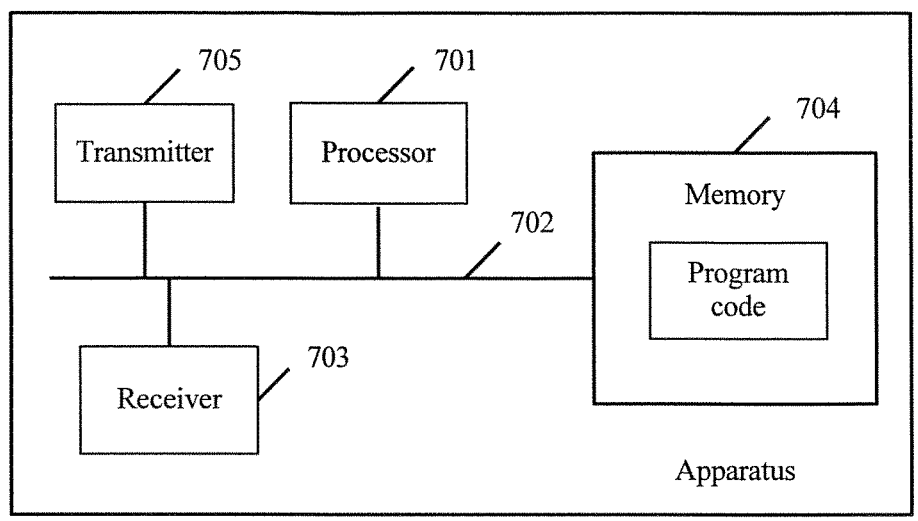
FIG. 7 is a schematic structural diagram of another embodiment of a robust channel RC-supporting coding and modulation apparatus according to the present invention.

FIG. 7 is a schematic structural diagram of another embodiment of a robust channel RC-supporting coding and modulation apparatus according to the present invention. As shown in FIG. 7, the apparatus may include at least one processor 701 such as a CPU, at least one receiver 703, at least one memory 704, at least one transmitter 705, and at least one communications bus 702. The communications bus 702 is configured to implement connections and communication between these components. The receiver 703 and the transmitter 705 of the apparatus in this embodiment of the present invention may be a wired sending port, or may be a wireless device, for example, including an antenna apparatus, and may be configured to perform signaling or data communication with another node device. The memory 704 may be a high-speed RAM memory, or may be a non-volatile memory, for example, at least one magnetic disk memory. Optionally, the memory 704 may be at least one storage apparatus that is located far away from the processor 701. The memory 704 stores a group of program code. The processor is configured to invoke the program code stored in the memory, and is configured to perform the following operations:

forming, on an interface between a PMD layer and a PMS-TC layer, a data frame by using bit data carried in a DMT symbol, where the bit data carried in the DMT symbol includes RC bit data that is obtained from an RC channel and service bit data that is obtained from a service data channel;

determining first-part bit data in the data frame as uncoded bit data on the interface between the PMD layer and the PMS-TC layer, where the first-part bit data includes the RC bit data, and coding second-part bit data in the data frame to obtain coded bit data, where the data frame includes the first-part bit data and the second-part bit data; and mapping, at the PMD layer, the uncoded bit data and the coded bit data onto multiple subcarriers corresponding to the data frame, and performing modulation to obtain modulated subcarriers, where the multiple subcarriers corresponding to the data frame include at least one RC subcarrier, and the RC bit data is mapped onto the at least one RC subcarrier.

It should be noted that, for brief description, the foregoing method embodiments are represented as a series of actions. However, a person skilled in the art should know that the present invention is not limited to the described order of the actions, because according to the present invention, some steps may be performed in other orders or simultaneously. In addition, a person skilled in the art should also know that the involved actions and modules are not necessarily mandatory to the present invention.

In the foregoing embodiments, the description of the embodiments has respective focuses. For a part that is not described in detail in an embodiment, refer to related descriptions in other embodiments.

A person of ordinary skill in the art may understand that all or a part of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, and an optical disk.

The method and the related device and system provided in the embodiments of the present invention are described in detail above. In this specification, specific examples are used to describe the principle and implementation manners of the present invention, and the description of the embodiments is only intended to help understand the method and core idea of the present invention. In addition, a person of ordinary skill in the art may, based on the idea of the present invention, make modifications with respect to the specific implementation manners and the application scope. Therefore, the content of this specification shall not be construed as a limitation to the present invention.

What is claimed is:

1. A robust channel (RC)-supporting coding and modulation method, the method comprising:

forming, on an interface between a physical media dependent (PMD) layer and a physical media specific transmission convergence (PMS-TC) layer, a data frame by using bit data carried in a discrete multi-tone (DMT) symbol, wherein the bit data carried in the DMT symbol comprises RC bit data that is obtained from an RC and service bit data that is obtained from a service data channel;

determining first-part bit data in the data frame as uncoded bit data on the interface between the PMD layer and the PMS-TC layer, wherein the first-part bit data comprises the RC bit data, and coding second-part bit data in the data frame to obtain coded bit data, wherein the data frame comprises the first-part bit data and the second-part bit data;

mapping, at the PMD layer, the uncoded bit data and the coded bit data onto multiple subcarriers corresponding to the data frame; and performing modulation to obtain modulated subcarriers;

wherein the multiple subcarriers corresponding to the data frame comprise at least one RC subcarrier, and the RC bit data is mapped onto the at least one RC subcarrier.

2. The method according to claim 1, wherein determining the first-part bit data in the data frame as uncoded bit data on the interface between the PMD layer and the PMS-TC layer, wherein the first-part bit data comprises the RC bit data, and coding second-part bit data in the data frame to obtain coded bit data comprises:

obtaining an amount of uncoded bit data carried in each subcarrier of the multiple subcarriers corresponding to the data frame; and calculating a sum of amounts of uncoded bit data carried in the multiple subcarriers, and using the sum as an amount of the first-part bit data in the data frame.

3. The method according to claim 1, wherein determining the first-part bit data in the data frame as uncoded bit data on the interface between the PMD layer and the PMS-TC layer, wherein the first-part bit data comprises the RC bit data, and coding second-part bit data in the data frame to obtain coded bit data comprises:

obtaining coding efficiency of coding bit data in the data frame;

obtaining an amount of coded bit data carried in each subcarrier of the multiple subcarriers corresponding to the data frame;

calculating a sum of amounts of coded bit data carried in the multiple subcarriers; and calculating an amount of the second-part bit data in the data frame according to the sum of the amounts of coded bit data carried in the multiple subcarriers and according to the coding efficiency of coding the second-part bit data in the data frame.

4. The method according to claim 1, wherein:

the modulated subcarrier comprises an uncoded subcarrier component and a coded subcarrier component; and mapping, at the PMD layer, the uncoded bit data and the coded bit data onto multiple subcarriers corresponding to the data frame, and performing modulation to obtain modulated subcarriers comprises:

separately obtaining an amount of uncoded bit data carried in a target subcarrier in the multiple subcarriers and an amount of coded bit data carried in the target subcarrier;

mapping the uncoded bit data onto the target subcarrier according to the amount of uncoded bit data carried in the target subcarrier, to obtain an uncoded subcarrier component of the target subcarrier; and mapping the coded bit data onto the target subcarrier according to the amount of coded bit data carried in the target subcarrier, to obtain a coded subcarrier component of the target subcarrier.

5. The method according to claim 1, wherein coding the second-part bit data in the data frame to obtain coded bit data comprises:

performing low-density parity-check coding on the second-part bit data in the data frame to obtain the coded bit data.

6. A robust channel (RC)-supporting coding and modulation apparatus, comprising:

a network interface;

a processor; and a memory, the memory comprising instructions that, when executed by the processor, cause the apparatus to:

form, on an interface between a physical media dependent (PMD) layer and a physical media specific transmission convergence (PMS-TC) layer, a data frame by using bit data carried in a discrete multi-tone (DMT) symbol, wherein the bit data carried in the DMT symbol comprises RC bit data that is obtained from an RC channel and service bit data that is obtained from a service data channel, determine first-part bit data in the data frame as uncoded bit data on the interface between the PMD layer and the PMS-TC layer, wherein the first-part bit data comprises the RC bit data, and coding second-part bit data in the data frame to obtain coded bit data, wherein the data frame comprises the first-part bit data and the second-part bit data, map, at the PMD layer, the uncoded bit data and the coded bit data onto multiple subcarriers corresponding to the data frame, and perform modulation to obtain modulated subcarriers;

wherein the multiple subcarriers corresponding to the data frame comprise at least one RC subcarrier, and the RC bit data is mapped onto the at least one RC subcarrier.

7. The apparatus according to claim 6, wherein the memory further comprises instructions that, when executed by the processor, cause the apparatus to:

obtain an amount of uncoded bit data carried in each subcarrier of the multiple subcarriers corresponding to the data frame;

calculate a sum of amounts of uncoded bit data carried in the multiple subcarriers; and use the sum as an amount of the first-part bit data in the data frame.

8. The apparatus according to claim 6, wherein the memory further comprises instructions that, when executed by the processor, cause the apparatus to:

obtain coding efficiency of coding bit data in the data frame;

obtain an amount of coded bit data carried in each subcarrier of the multiple subcarriers corresponding to the data frame;

calculate a sum of amounts of coded bit data carried in the multiple subcarriers; and calculate an amount of the second-part bit data in the data frame according to the sum of the amounts of coded bit data carried in the multiple subcarriers and according to the coding efficiency of coding the bit data in the data frame.

9. The apparatus according to claim 6, wherein the memory further comprises instructions that, when executed by the processor, cause the apparatus to:

separately obtain an amount of uncoded bit data carried in a target subcarrier in the multiple subcarriers and an amount of coded bit data carried in the target subcarrier;

map the uncoded bit data onto the target subcarrier according to the amount of uncoded bit data carried in the target subcarrier, to obtain an uncoded subcarrier component of the target subcarrier; and map the coded bit data onto the target subcarrier according to the amount of coded bit data carried in the target subcarrier, to obtain a coded subcarrier component of the target subcarrier.

10. The apparatus according to claim 6, wherein the memory further comprises instructions that, when executed by the processor, cause the apparatus to:

perform low-density parity-check coding on the second-part bit data in the data frame to obtain the coded bit data.

* * * * *